US012712489B1

(12) United States Patent
Kyne et al.

(10) Patent No.: US 12,712,489 B1
(45) Date of Patent: Aug. 18, 2026

(54) SOLAR PANEL CALCULATION SYSTEM

(71) Applicant: United States Automobile Association (USAA), San Antonio, TX (US)

(72) Inventors: Michael Kyne, Saint Petersburg, FL (US); Amanda Michelle Boyd, Denver, CO (US); Galo Alava, Tampa, FL (US); Sydney Ann Conrad-Cook, Van Meter, IA (US); Courtney Evans, Fourney, TX (US); Gregory Mark Lamontagne, Helotes, TX (US); Spencer Funk, Hot Springs, AR (US); Jess W. Gingrich, San Antonio, TX (US)

(73) Assignee: United States Automobile Association (USAA), San Antonio, TX (US)

( * ) Notice: Subject to any disclaimer, the term of this patent is extended or adjusted under 35 U.S.C. 154(b) by 292 days.

(21) Appl. No.: 18/240,949

(22) Filed: Aug. 31, 2023

(51) Int. Cl.
*H02S 50/00* (2014.01)
*G06T 7/11* (2017.01)
*G06T 7/62* (2017.01)
*H02S 20/23* (2014.01)

(52) U.S. Cl.
CPC ................ *H02S 50/00* (2013.01); *G06T 7/11* (2017.01); *G06T 7/62* (2017.01); *G06T 2200/24* (2013.01); *G06T 2207/10032* (2013.01); *G06T 2207/30184* (2013.01); *G06T 2207/30242* (2013.01); *H02S 20/23* (2014.12)

(58) Field of Classification Search
CPC . H02S 50/00; H02S 20/23; G06T 7/11; G06T 7/62; G06T 2200/24; G06T 2207/10032; G06T 2207/30184; G06T 2207/30242
See application file for complete search history.

(56) References Cited

U.S. PATENT DOCUMENTS

| | | | | |
|---|---|---|---|---|
| 9,526,587 | B2 * | 12/2016 | Zhao | A61B 34/37 |
| 9,767,545 | B2 * | 9/2017 | Koppal | G06T 5/50 |
| 10,061,957 | B2 * | 8/2018 | Yoscovich | H02S 50/00 |
| 11,625,511 | B1 * | 4/2023 | Campau | H02S 50/00 703/1 |
| 11,798,263 | B1 * | 10/2023 | Prabhudesai | G06V 10/764 |
| 12,154,308 | B1 * | 11/2024 | Somasundaram | G06T 7/13 |
| 12,249,055 | B1 * | 3/2025 | Pelletier | G06T 7/80 |
| 2009/0293932 | A1 * | 12/2009 | Augenbraun | H02S 40/32 136/244 |

(Continued)

FOREIGN PATENT DOCUMENTS

| | | | |
|---|---|---|---|
| WO | WO-2017035398 A1 * | 3/2017 | G06T 11/26 |
| WO | WO-2019010387 A1 * | 1/2019 | H02S 20/32 |

*Primary Examiner* — Mia M Thomas

(74) *Attorney, Agent, or Firm* — Fletcher Yoder, P.C.

(57) ABSTRACT

Systems and methods for calculating a number of solar panels from imaging data are provided. A computing system may receive imaging data including images of one or more solar arrays, wherein each of the one or more solar arrays comprises a plurality of solar panels. The computing system may determine a total area of each of the one or more solar arrays from the imaging data. The computing system may also calculate a number of the solar panels on each of the one or more solar arrays using the total determined area of each of the one or more solar arrays. The calculated number of solar panels may be used in appraisal and valuation of a property.

19 Claims, 5 Drawing Sheets

(56) References Cited

U.S. PATENT DOCUMENTS

2014/0041321 A1* 2/2014 Poivet .................... F24S 40/44 52/173.3
2014/0267391 A1* 9/2014 Cummings .......... G06T 11/206 345/629
2015/0199104 A1* 7/2015 Gontowski ........... G06Q 30/08 715/771
2015/0287211 A1* 10/2015 Mundhenk ............. G06T 7/143 382/173
2015/0294428 A1* 10/2015 Salmon ................. G01R 21/00 705/7.23
2016/0238388 A1* 8/2016 MacDonald ........... H02S 99/00
2016/0365825 A1* 12/2016 Poivet .................... F24S 20/66
2017/0091578 A1* 3/2017 Ananthakrishnan ........................ G06V 20/176
2019/0031344 A1* 1/2019 Hitchcock ............. B64U 10/13
2019/0158011 A1* 5/2019 West ..................... G06N 20/20
2020/0036325 A1* 1/2020 Poivet .................... H02S 30/20
2020/0279367 A1* 9/2020 White ................. G05D 1/0038
2021/0141047 A1* 5/2021 Ma ....................... G01S 3/7861
2021/0159851 A1* 5/2021 Glaister ................ G06Q 50/06
2021/0339711 A1* 11/2021 Menicovich ............. B60S 1/56
2022/0026228 A1* 1/2022 Kasioumis .............. G06N 3/08
2022/0139024 A1* 5/2022 Loveland ............... G06T 17/05 345/426
2022/0335176 A1* 10/2022 Haddock ................ G06F 30/18
2022/0407455 A1* 12/2022 Conti ..................... H10F 19/37
2023/0035847 A1* 2/2023 Abbaraju .............. G05D 3/105
2023/0072190 A1* 3/2023 Spaeth .................... F24F 11/38
2023/0387853 A1* 11/2023 Russell .................. H02S 20/23
2024/0029277 A1* 1/2024 Wang .................... H04N 7/188
2024/0051146 A1* 2/2024 Luan ....................... B25J 9/163
2024/0051152 A1* 2/2024 Tadepalli ................. G06T 7/12
2024/0344500 A1* 10/2024 Schultz .................. H02S 10/12
2024/0356488 A1* 10/2024 Tadepalli ................. G06T 7/90
2024/0380355 A1* 11/2024 Hazra .................... B63B 79/20
2025/0030375 A1* 1/2025 Rakshit .................. H02S 50/00
2025/0202425 A1* 6/2025 Mcdonald ................ B07C 5/34
2025/0299607 A1* 9/2025 Twiss ....................... H02J 3/46
2026/0004460 A1* 1/2026 Lipunov .................. G06T 7/80

* cited by examiner

| SP Type | Dimensions (Ft.) | Area (Sq.Ft.) | Range (Sq.Ft.) |
| --- | --- | --- | --- |
| | | | |
| Small | 4.85 x 2.2 | 10.67 | < 14 |
| Medium | 5.46 x 3.28 | 17.93 | 14 - 19 |
| Large | 6.64 x 3.29 | 21.87 | 19.01 - 23 |
| Extra Large | 7.24  3.4 | 24.62 | > 23 |
| | | | |
| Average | 6.04 x 3.04 | 18.36 | |

SA 1 = 360 Sq Ft
360 Sq Ft / 18 Sq Ft / SP = 20 SP
Actual = 20 SP

SA 2 = 576 Sq Ft
576 Sq Ft / 18 Sq Ft / SP = 32 SP
Actual = 32 SP

Total Solar Panels Counted = 20 SP + 32 SP = 52 SP

SA1 = 252 Sq Ft
242 Sq Ft / 18 Sq Ft / SP = 14 SP
Actual = 14 SP

SA 2 = 180
180 Sq Ft / 18 Sq Ft / SP = 10 SP
Actual = 9 SP

Total Solar Panels Counted = 14 SP + 10 SP = 24
Range in Dropdown: 21 SP - 30 SP

SOLAR PANEL CALCULATION SYSTEM

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admission of prior art.

Insurance providers are often responsible for providing custom-developed replacement costs for insured properties, including valuation of custom items found on or added to the property. Insurance providers are tasked with determining an overall value of a property to determine the amount of insurance needed to fully cover the property, as well as assessing various custom items on a property that may add to the property value or may be independently insured for replacement costs, in the event of damage. One often-overlooked area when determining appraisal values is the installation of solar panels. Property owners often neglect to inform insurance providers about newly installed solar panels, which may be an important factor in determining insurance premiums and replacement costs.

Initially, an insurance provider may visit a property to assess the property, but if solar panels are installed after the initial assessment, the insurance provider may be unware of the addition. Further, it may be burdensome for the insurance provider to physically visit every property to provide an assessment of the property value even once, much less on a periodic basis to check for new structures. Still further, structures such as solar panels may be difficult to see from the ground, and thus these structures may be overlooked when calculating the total insurable value of the property.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method is provided. The method comprises receiving, at a computing system, imaging data including images of one or more solar arrays, wherein each of the one or more solar arrays comprises a plurality of solar panels. The method further comprises determining, by the computing system, a total area of each of the one or more solar arrays from the imaging data. Still further, the method comprises calculating, by the computing system, a number of the solar panels on each of the one or more solar arrays using the total determined area of each of the one or more solar arrays.

In another embodiment, a system comprising a processor and tangible, non-transitory, computer-readable media including instructions is provided. The instructions, when executed by the processor, cause the processor to determine an area of one or more solar arrays from imaging data of the one or more solar arrays. Further, the instructions, when executed by the processor, cause the processor to calculate a number of solar panels in each of the one or more solar arrays based on the determined area of each of the one or more solar arrays.

In another embodiment, a system comprising a mass storage device and a processor is provided. The processor is configured to receive imaging data including one or more solar arrays from the mass storage device. Further, the processor is configured to determine an area of one or more solar arrays from the imaging data. Still further, the processor is configured to calculate a number of solar panels in each of the one or more solar arrays based on the determined area of each of the one or more solar arrays.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
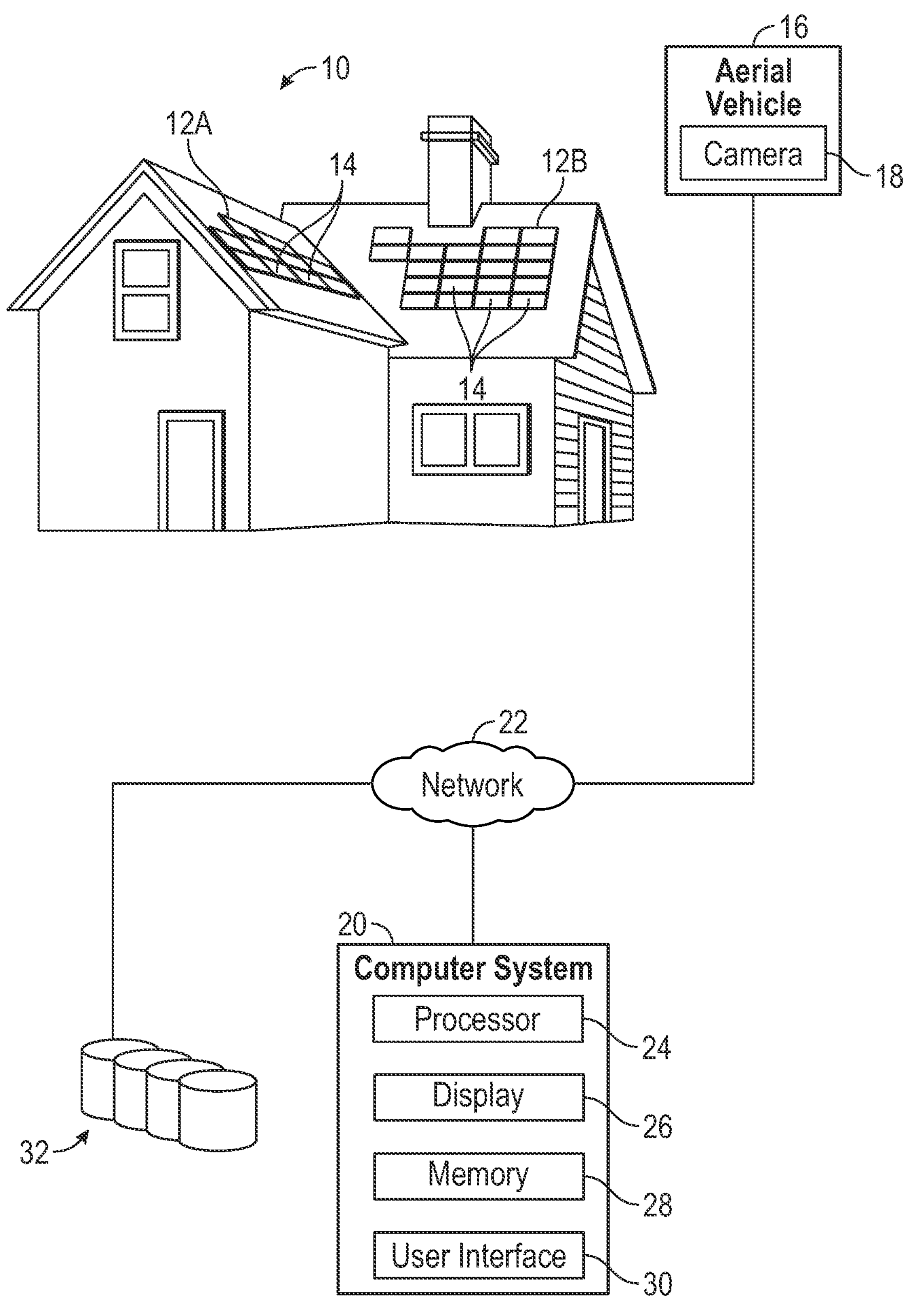
FIG. 1 illustrates an example of a system that may be used to calculate a number of solar panels on a property, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms “automatic” and “automatically” refer to actions that are performed by a computing device or computing system (e.g., of one or more computing devices) without human intervention. For example, automatically performed functions may be performed by computing devices or systems based solely on data stored on and/or received by the computing devices or systems despite the fact that no human users have prompted the computing devices or systems to perform such functions. As but one non-limiting example, the computing devices or systems may make decisions and/or initiate other functions based solely on the decisions made by the computing devices or systems, regardless of any other inputs relating to the decisions.

As used herein, the term “computing system,” “processing system” or “control system” refers to an electronic computing device such as, but not limited to, a single computer, virtual machine, virtual container, host, server, laptop, wearable and/or mobile device, or to a plurality of electronic computing devices working together to perform the function described as being performed on or by the computing or control system. As used herein, the term “medium” refers to one or more non-transitory, computer-readable physical media that together store the contents described as being stored thereon. Embodiments may include non-volatile secondary storage, read-only memory (ROM), and/or random-access memory (RAM). The methods described herein may be encoded as executable instructions embodied in a computer readable medium, including, without limitation, a storage device and/or a memory device. Such instructions, when executed by a processing device, cause the processing device to perform at least a portion of the methods described herein. It should be noted that non-transitory merely indicates that the media is tangible and not a signal. The above examples are exemplary only, and thus are not intended to limit in any way the definition and/or meaning of the term processor, processing system, processing device, or the like.

The present disclosure relates to systems and methods for obtaining information, such as imaging information (e.g., photographs) indicating that solar panels (SPs) have been installed on a property, and estimating a number of solar panels installed based on the imaging information. The determination of the number of solar panels installed on a property may be used in property valuation for insurance purposes. For instance, solar panels may be installed on the roof of a home, on another structure on a property or on the ground next to a home or structure. Imaging information, such as photographs, of the array(s) of solar panels (i.e., solar arrays (SA)) may be aerial imagery obtained from an aerial vehicle, such as a satellite, airplane or drone, for instance. From the imaging data, a total area of a solar array may be approximated, and from the approximation of the total area of the solar array, an approximate number of solar panels may be calculated.

In one embodiment, the total number of solar panels may be approximated by dividing the total solar array area by an estimated average area of a solar panel. The estimated average area of a solar panel may be determined based on the average area of the most frequently used, commercially available solar panels, for instance. In another embodiment, rather than using the average area of all typically installed solar panels (i.e., a single average of all solar panels), multiple sizes of solar panels may be selectable by a user, automatically and/or through a machine learning tool, to calculate the number of solar panels. For instance, the solar panels may be categorized by panel type, such as small, medium, large and extra-large, for instance, and an average area of each size category or panel type may be used to calculate the number of solar panels. The calculation of the number of solar panels may then be used by an insurance provider to assess a value to the solar panels for usage in determining insurance premiums and replacement values. Further using aerial imaging data to approximate the number of solar panels in accordance with the present embodiments, may facilitate provision and/or modification of insurance rates, warranties, claims, loans, reimbursements, and the like, on a periodic basis, such that rates can be frequently reviewed and adjusted, without the need for an in-person inspection of the insured property and without reliance on a customer to provide the information to the insurance provider.

Turning now to FIG. 1, systems and methods for calculating a number of solar panels on or next to a structure (or property) or on the ground, using imaging data are described. As illustrated, a house 10 includes two solar panel arrays (SAs) 12. Specifically, the house includes a first solar array 12A (SA 1) and a second solar array 12B (SA 2). Each solar array 12 includes a plurality of solar panels (SPs) 14. While FIG. 1 illustrates the solar arrays 12 being mounted on a house 10, the solar arrays 12 may be mounted on any structure, such as a barn, warehouse, or other mounting structure. Further, while two solar arrays 12 are illustrated, fewer or more solar arrays 12 may be included.

As previously described, an insurance provider may be unaware of the presence of solar arrays 12 when appraising a property to calculate the appropriate value and corresponding premiums, either because an insurance adjuster was unable to perform an in-person inspection, the solar arrays 12 were not readily visible or the solar arrays 12 were added after an initial appraisal. Thus, in accordance with embodiments disclosed herein, an aerial vehicle 16 may be used to capture imaging information, such as photographs of the rooftop of the house 10. The aerial vehicle 16 may be a drone, balloon, unmanned vehicle, airplane, satellite, or airborne craft or instrument capable of capturing imaging data.

To capture the imaging data, the aerial vehicle 16 may include a camera 18, for instance. Alternatively, the aerial vehicle 16 may include other types of equipment to capture imaging data, such as video, infrared, X-ray, LIDAR, RADAR, panchromatic, or any other imaging data that provides an image illustrating the periphery of the solar arrays 12, and discern the solar arrays 12 from surrounding objects or background. As will be described in further detail below, it is not necessary that the imaging data be of such a high resolution or quality to discern the individual solar panels 14 on each solar array 12. Rather, in accordance with the techniques described herein, the imaging data (e.g., photograph) need only be of sufficient resolution or quality to discern the periphery and thus area of the solar arrays 12. While not illustrated, the aerial vehicle 16 includes other components to aid in the acquisition, storage and transmission of the imaging data to external devices such as a computing system, as will be appreciated.

In certain embodiments, the imaging data may be an ortho-photograph or other ortho-imagery. As will be appreciated, an ortho-image may provide geometrically corrected (i.e., “orthorectified”) images such that the scale is uniform, compared to an uncorrected aerial photograph, for example. Thus, an ortho-photograph may be more accurate as it corrects for certain topographical relief, lens distortion, cameral tilt, etc. In other embodiments, the imaging data may include digital elevation data, which may be more accurate still than ortho-imagery, but may be more difficult or expensive to obtain. For instance, such digital elevation data may include digital elevation models (DEMs), digital surface models (DSMs), digital terrain models (DTMs) or the like. Digital elevation imaging data may provide for additional analysis in identifying structures, aspects and slopes of features. Thus, for a particularly steep rooftop having solar arrays 12 thereon, digital elevation data may be used to produce DSMs that more accurately estimate the area of the solar arrays 12 by taking into account an approximated pitch of the rooftop or mounting surface. While digital elevation data may be more expensive, more difficult or slower to obtain, in certain embodiments, such imaging data may be used to provide additional accuracy if a particular application would benefit from additional imaging data and object modeling accuracy.

Further, the imaging data may be obtained (e.g., purchased) from a third party and stored in one or more mass storage devices 32 including one or more databases or stored in memory 28 for later use by the insurance provider, in accordance with the described techniques. For instance, a vendor specializing in aerial imaging for electronic mapping may provide (e.g., sell) the imaging data for use by the insurance provider. Thus, an insurance provider may purchase imaging data of a particular house, neighborhood or area such that the imaging data can be used for solar panel estimation and property valuation, according to the disclose embodiments.

Once the imaging data of the solar arrays 12 is captured by the imaging device (e.g., camera 18) on the aerial vehicle 16, it may be transmitted to a computing system 20 through a network 22. The network 22 may be a cloud based network such as a wide area network (WAN). The network 22 facilitates communication of information over communications links, such as common carrier telephone lines, optical light paths, synchronous optical networks (SONET), synchronous digital hierarchy (SDH) links, or Powerline Communications (PLC), and others.

The computing system 20 may be accessible to a user, such as an agent or adjuster, of an insurance provider. To facilitate the techniques described herein, the computing system 20 may include a number components, such as one or more processors 24, a display 26, memory 28 and one or more user interfaces 30. Further, while the imaging data from the aerial vehicle 16 may be transmitted directly to the computing system 20 through the network 22 for processing, the imaging data may instead (or in addition) be transmitted to one or more mass storage devices 32 (e.g., magnetic devices, magneto optical disks, optical disks, or the like) having one or more databases for storage and later retrieval by the computing system 20. The mass storage devices 32 may include imaging data of many properties that may be accessed by the computing system 20, as necessary, to evaluate and appraise various aspects of a property, such as for use in approximating the number of solar panels 14 on a property, as described herein. Further, imaging data stored in the mass storage devices 32 and corresponding to a particular property (e.g., the house 10), may be updated periodically (e.g., quarterly, annually, etc.) such that the imaging data may be previewed periodically and any updated installation of solar arrays 12 can be discerned.

Once the imaging data is received/retrieved by the computing system 20, the computing system 20 may utilize the techniques described herein to calculate the number of solar panels 14 on a property, as will be described below. The calculation of the number of solar panels 14 may be determined automatically from the imaging data, without user-input. Alternatively, the calculation may be determined, reviewed or supplemented by input from a user, as will be described below. One or more processors 24 may be used to perform one or more operations associated with calculating the number of solar panels 14 from the imaging data. The processor 24 may be any type of computer processor or microprocessor capable of executing computer-executable code of a computer program stored as computer readable media. The processor 24 may also include multiple processors that may perform the operations described herein. Processors 24 suitable for the execution of a computer program include, by way of example, both general and special purpose microprocessors, and/or processor(s) of any appropriate kind of digital computer. Generally, a processor 24 may receive instructions and data from memory 28, such as read only memory, random access memory, or both. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor 24 and the memory 28 may be supplemented by, or incorporated in, special purpose logic circuitry.

The memory 28 may be any suitable articles of manufacture that can serve as media to store processor-executable code, data, or the like. These articles of manufacture may represent computer-readable media (e.g., any suitable form of memory or storage) that may store the processor-executable code as an application used by the processor 24 to perform the presently disclosed techniques. The application may include any suitable computer software or program that may be installed onto the computing system 20 and executed by the processor 24. The memory 28 may represent non-transitory computer-readable media (e.g., any suitable form of memory or storage) that may store the processor-executable code used by the processor 24 to perform various techniques described herein. It should be noted that non-transitory merely indicates that the media is tangible and not a signal.

The display 26 may depict visualizations associated with software or executable code being processed by the processor 24 such that a user (e.g., an insurance adjuster, agent, appraiser, etc.) can review the information and subsequent calculations. In one embodiment, the display 26 may be a touch display capable of receiving inputs from a user of the computing system 20 through a user interface 30. The display 26 may be any suitable type of display, such as a liquid crystal display (LCD), plasma display, or an organic light emitting diode (OLED) display, for example. Additionally, in one embodiment, the display 26 may be provided in conjunction with a touch-sensitive mechanism (e.g., a touch screen) that may function as part of the user interface 30 for the computing system 20.

The user interface 30 may be a wireless or wired communication component that may facilitate communication between the computing system 20, the aerial vehicle 16, the mass storage devices 32 and various other computing systems and components, via the network 22, the Internet, or the like. In addition to or alternative to a touch screen described above, the user interface 30 may include a keyboard and a pointing device, e.g., a mouse or a trackball, by which the user (e.g., insurance adjuster, agent, appraiser, etc.) may provide input to the computing system 20. Other devices may be included as a user interface 30 to provide for interaction with a user, as well. For example, input from the user may be provided through any user interface 30 in any appropriate form, including acoustic, speech, or tactile input. Further, the user interface 30 may provide a user with the ability to view and supplement certain aspects of the imaging data provided (e.g., photographs), for further assessment.

In general, it should be understood that the computing system 20 may include one or more computing devices of any suitable type. The computing device(s) may include, but are not limited to: a personal computer, a smartphone, a tablet computer, a wearable computer, an automotive computer, a desktop computer, a laptop computer, a notebook computer, a network computer, a server computer, a mainframe computer, a distributed computing device (e.g., a cloud computing device), a microcomputer, a system on chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Further, in some embodiments, the computing system 20 may use visual machine learning or other artificial intelligence (AI) to identify a number of solar panels 14 from the imaging data depicting the area (e.g., square footage) of each solar array 12, provided to the computing system 20. For instance, the computing system 20 may use visual machine learning or other AI to train itself using images provided from external sources, such solar panel venders, insurance adjusters, etc. By using images previously identified by type or size of the solar panels 14, a visual learning machine in the computing system 20 may learn features or aspects of the later provided imaging data (i.e., photographs) to more accurately discern and calculate a number of solar panels 14 in an image of a solar array 12, using the area of a particular solar array 12.

In some embodiments, advanced analytics and/or machine learning models may be used to identify (e.g., detect) the objects in the acquired imaging data. For instance, Convolutional Neural Networks (CNN), Region-Based Convolutional Neural Networks (R-CNN), Fast R-CNN or Faster R-CNN may be employed to accurately detect particular objections (e.g., solar arrays 12) as distinguishable from other features in the imaging data (e.g., a rooftop, trees or other features in the imaging data) through known modeling techniques. Alternatively, single pass models, such as You Only Look Once (YOLO) models may be used to distinguish objects in the imaging data even faster, though with less accuracy. Advantageously, in accordance with the techniques described herein, single pass models may provide sufficient accuracy for certain applications.

Figure 2:
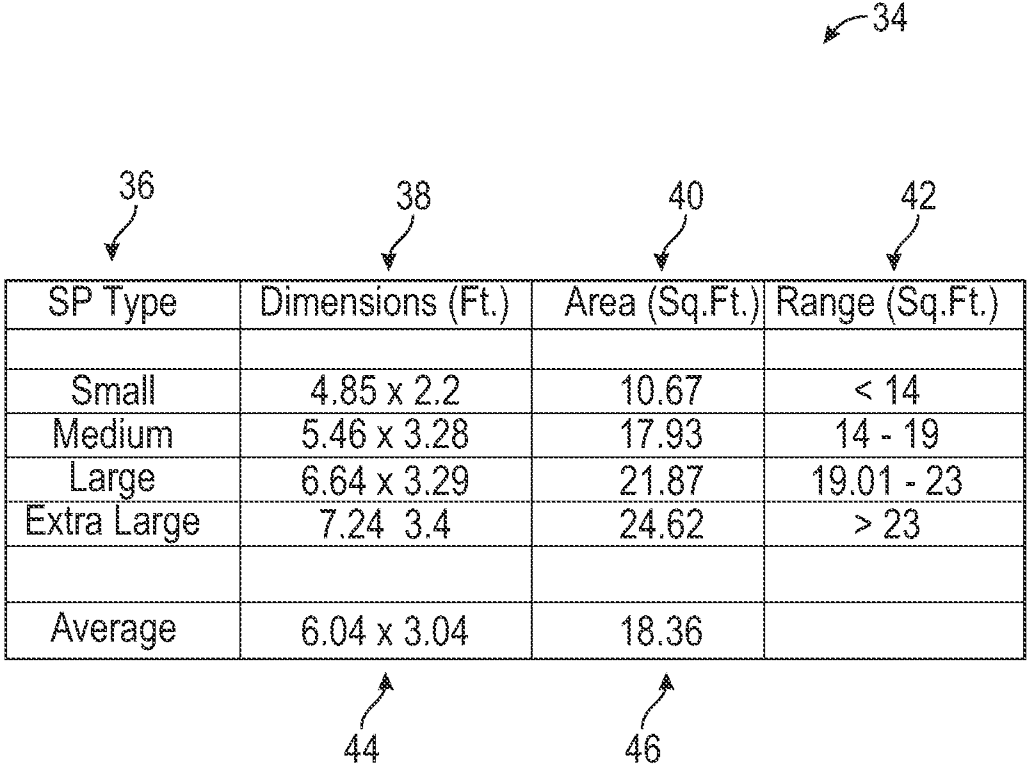
FIG. 2 illustrates an example of solar panel types and dimensions that may be used in the system of FIG. 1, in accordance with embodiments described herein.

Turning now to FIG. 2, a table 34 including examples of types 36 of solar panels (SPs) is provided. For instance, the table 34 includes SMALL, MEDIUM, LARGE AND EXTRA-LARGE SPs. For illustrative purposes, a sample dimension 38 (length×width) and area 40 are provided for each SP type 36. The sample dimensions 38 and areas 40 corresponding to each SP type 36 correspond to typical commercially available solar panels, for instance. For each SP type 36, a sample range 42 of areas may also be estimated for use in classifying the SP type 36. Thus, a SMALL SP may be any solar panel with an area in the range 42 of less than 14 square feet (sq. ft.), for instance, a MEDIUM SP may be any solar panel with an area in the range 42 of 14-19 sq. ft., a LARGE SP may be any solar panel with an area in the range 42 of 19.01-23 sq. ft., while an EXTRA-LARGE SP may be any solar panel with an area in the range 42 of greater 23 sq. ft. The particular ranges 42 are provided by way of example and may be used in accordance with the disclosed techniques to more accurately calculate a number of solar panels 14 of a solar array 12, as described in greater detail below.

Figure 3:
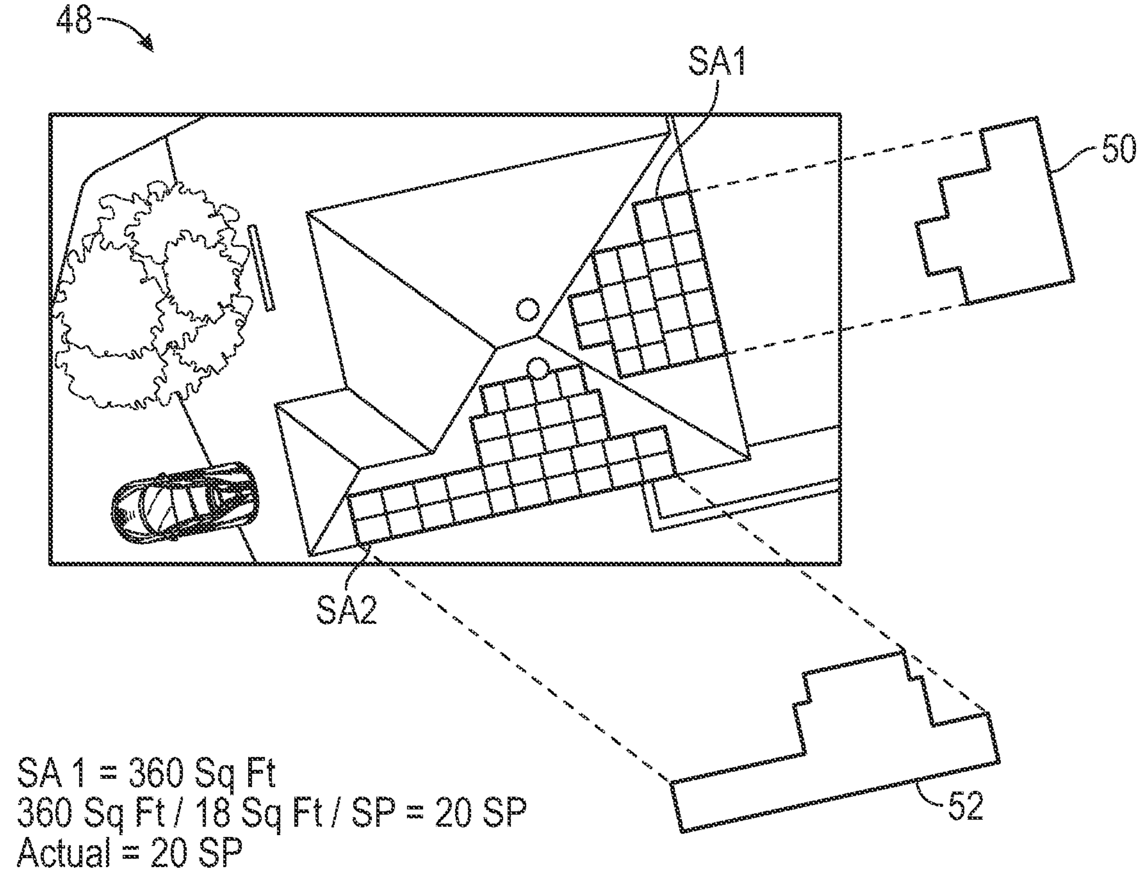
FIG. 3 illustrates an example of imaging data depicting solar arrays and techniques for calculating a number of solar panels in the solar arrays, in accordance with embodiments described herein.
Figure 4:
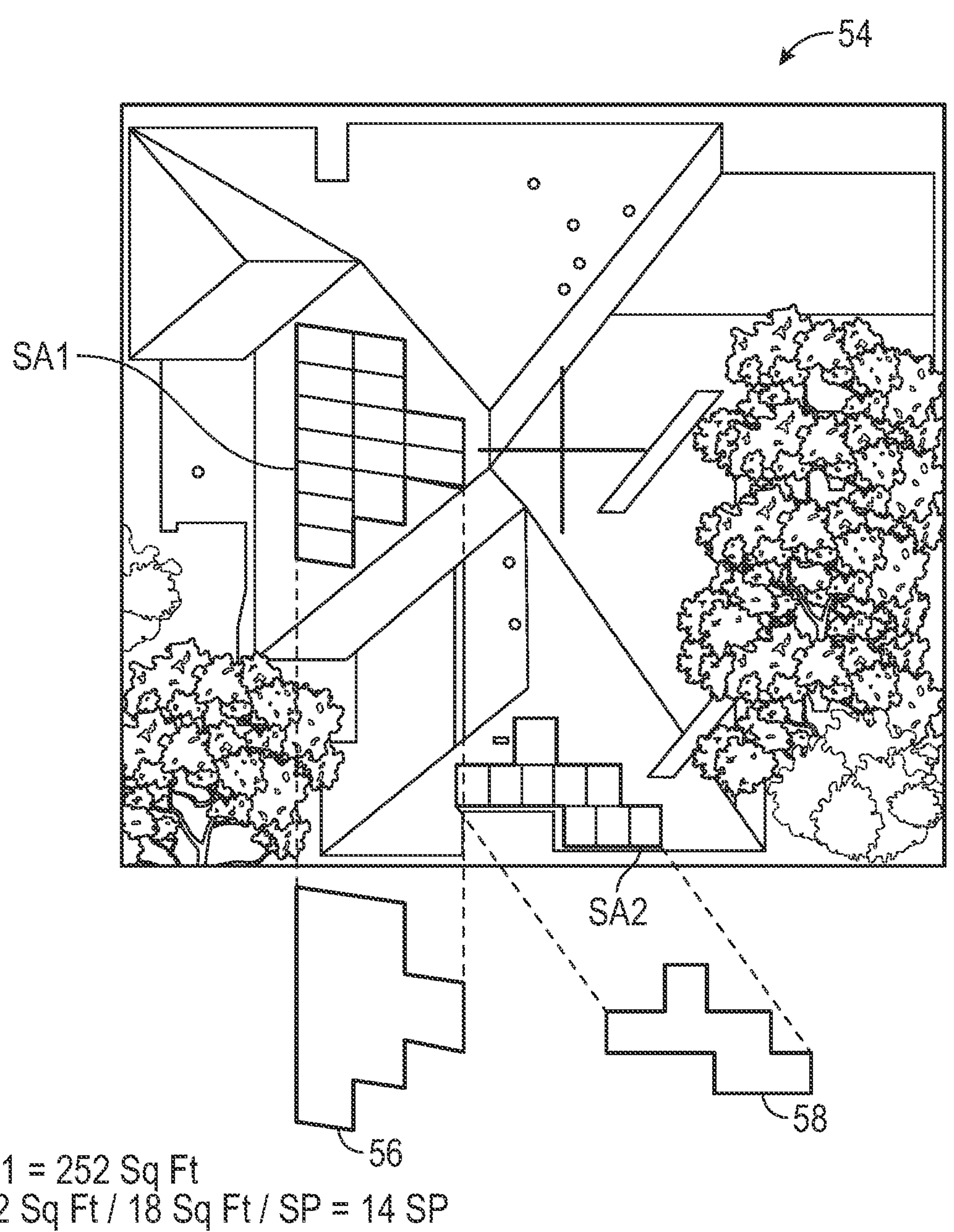
FIG. 4 illustrates another example of imaging data depicting solar arrays and techniques for calculating a number of solar panels in the solar arrays, in accordance with embodiments described herein.

As will be illustrated with regard to FIGS. 3 and 4, rather than discerning an SP type 36, when evaluating a solar array 12 for estimation of the number of solar panels 14, it may be most efficient, and indeed sufficiently accurate, to utilize an average area of all SP types 36. For instance, using the SP types 36 illustrated in the table 34, the average dimension 44 of all SP types 36 can be approximated. For instance, the average dimension 44 of all SP types 36 is approximately 6.04 ft. by 3.04 ft. Accordingly, the average area 46 of all SP types 36 is approximately 18.36 sq. ft. For simplicity, the average area 46 of all SP types 36 can be approximated to be 18 sq. ft. for calculation purposes, as described below. These numbers can be adjusted, based on commercial data or other information available. As will be described, the average area of a solar panel (e.g., area 40 or area 46) may be used to calculate the number of solar panels 14 present in a solar array 12, as depicted from the imaging data provided to the computing system 20.

To illustrate the disclosed techniques, FIG. 3 provides imaging data 48 (e.g., photograph) of the rooftop of a house 10 having two solar arrays 12 (e.g., SA 1 and SA 2) installed thereon. The imaging data 48 may be received by the processor 24 of the computing system 20. Each solar array SA 1 and SA 2 may include a number of solar panels 14, as described above. From the imaging data 48, a periphery of each solar array SA 1 and SA 2 may be discerned and extracted to define the area of each solar array SA 1 and SA 2. For instance, SA 1 may have a periphery that defines an area 50, and SA 2 may have a periphery that defines an area 52. By extracting the peripheries to define the areas 50 and 52, an approximate square footage (i.e., the area) of each solar array SA 1 and SA 2 may be automatically calculated by the processor 24, once the imaging data 48 is received by the computing system 20, for example.

Any suitable techniques may be utilized to determine the approximate area 50 and 52 within each periphery. While a single photograph is illustrated as the imaging data 48, multiple photographs from multiple cameras or multiple photographs taken from multiple locations utilizing a single camera (e.g., the camera 18) may be utilized to approximate the area 50 and 52 of each solar array SA 1 and SA 2. For instance, imaging data may be gathered from multiple known positions, wherein triangulation may be used to determine the area 50 and 52 of each solar array SA 1 and SA 2. In some embodiments existing aerial multi-hazard imagery (AMHZI) modeling data and techniques may be used to approximate the area 50 and 52 of each solar array SA 1 and SA 2. In other embodiments, computer vision programs stored in the memory 28 may be used to discern the solar arrays SA 1 and SA 2, such that their respective areas 50 and 52 may be calculated. The computing system 20 may use visual machine learning or other artificial intelligence (AI) to identify a number of solar panels 14 from the imaging data 48 depicting the area 50 and 52 (e.g., square footage) of each solar array SA 1 and SA 2, provided to the computing system 20. Systems, such as a global positioning system (GPS) or global navigation satellite system (GNSS), for example, may be utilized to gather additional data that might be used by the processor 24 to approximate an area 50 and 52 of each solar array SA 1 and SA 2. Certain techniques for determining the area 50 and 52 from an aerial image may include using a known value, such as a football field length, to calibrate size estimation from a particular height of the aerial vehicle 16. Further, the computing system 20 may access information related to established dimensions of the house 10 (e.g., through city permits) for comparison to the image of the house 10, relative to the solar arrays SA 1 and SA2. As should be appreciate by those skilled in the art, any techniques for approximating the area of a structure, such as the areas 50 and 52 of the solar arrays SA 1 and SA 2 may be utilized in embodiments of the invention described herein.

Once the area of a solar array 12 is determined from the imaging data 48, the processor 24 can be used to automatically calculate the number of solar panels 14 for each solar array 12. For instance, in the example of FIG. 3, the area 50 of the first solar array SA 1 is determined to be 360 sq. ft., utilizing the imaging data 48. The area 52 of the second solar array SA 2 is determined to be 576 sq. ft., utilizing the imaging data 48. In one embodiment, the number of solar panels 14 in each solar array 12 can be determined by dividing the total areas 50 and 52 of each solar array SA 1 and SA 2 by a selected or pre-determined average area of a solar panel 14. For example, as noted in FIG. 2, the average size (e.g., area) of a solar panel 14 is approximately 18 sq. ft. Accordingly, to determine the number of solar panels 14 in the first solar array SA 1, the area of the first solar array SA 1 (i.e., 360 sq. ft.) is divided by the average size of a solar panel (i.e., 18 sq. ft. per SP). Thus, in the presently illustrated example, the first solar array SA 1 is calculated to include 20 SPs (i.e., 360/18=20). Similarly, to determine the number of solar panels 14 in the second solar array SA 2, the area of the second solar array SA 2 (i.e., 576 sq. ft.) is divided by the average size of a solar panel (i.e., 18 sq. ft. per SP). Accordingly, in the presently illustrated example, the second solar array SA 2 is calculated to include 20 SPs (i.e., 576/18=32).

In the example of FIG. 3, the total number of solar panels 14 included on the house 10 in the imaging data 48 is 52 SPs (i.e., 20+32). By automatically calculating the number of solar panels 14 on a house 10 (or other structure), an insurance provider is better able to assess the value of the property by including the value of the solar panels 14. As previously described, because the imaging data 48 is only used to discern the area of each solar array 12 rather than each individual solar panel 14, the imaging data 48 may be of a lower resolution than imaging data that might otherwise be utilized to visually discern each solar panel 14. That is, the imaging data 48 need only provide enough resolution to discern the respective peripheries of the solar arrays 12, such that an area of each solar array can be approximated.

For illustrative purposes, the calculated number of solar panels 14 can be compared to the actual number of solar panels 14. In the illustrated example which utilized the approximate average area 46 of all typical commercially available solar panels 14 (i.e., 18 sq. ft. per SP), the calculated number of solar panels 14 in each solar array SA 1 and SA 2 accurately reflects the actual number of solar panels 14. For instance, in the illustrated example, the first solar array SA 1 includes 20 SPs, which is the same as the number of SPs that were calculated using the disclosed techniques. Similarly, the second solar array SA 2 includes 32 SPs, which is the same as the number of SPs that were calculated using the disclosed techniques. In most cases, using the average area of commonly used commercial solar panels (e.g., 18 sq. ft.) will accurately determine the number of solar panels 14 of a given solar array 12.

In alternative embodiments, rather than using the average area of all commercially available solar panels 14 (e.g., 18 sq. ft.) to calculate the number of solar panels 14 in the solar array 12, using the imaging data 48, other information may be used. For instance, if it can be determined what type of solar panel 14 was installed, the calculation can be adjusted by utilizing the additional information. In one example, if an insurance provider determines that solar panels 14 were installed, the insurance provider may send a query to the customer asking for information related to the solar panels 12. For instance, a customer may provide the name of the manufacturing company or a particular part number corresponding to the solar panels 14 that were purchased. A parts list, manufacturers list, or the like, may be stored in the memory 28 or in a database of the mass storage devices 32 such that the processor 24 can use the additional information to more accurately calculate the number of solar panels 14. For instance, if a part number for the solar panel 14 is provided, the processor 24 may check a database in the mass storage devices 32 to determine the SP type (e.g., size) corresponding to the part number. The SP type can be used to more accurately calculate the number of solar panels 14 from the imaging data 48. For example, if the part number indicates that the solar panels 14 that were installed are LARGE, the processor 24 may calculate the total number of solar panels 14 by using the area of the solar array 12 extracted from the imaging data 48 and dividing the area by 22 sq. ft. (i.e., the approximate area of LARGE solar panels from FIG. 2), rather than dividing by 18 sq. ft. In other words, in some embodiments, additional information may allow for a more accurate calculation of the total number of solar panels 14 in a particular solar array 12.

To illustrate another example of the disclosed techniques, FIG. 4 provides imaging data 54 (e.g., photograph) of the rooftop of a house 10 having two solar arrays 12 (e.g., SA 1 and SA 2) installed and that may be received by the processor 24 of the computing system 20. Each solar array SA 1 and SA 2 may include a number of solar panels 14, as described above. From the imaging data 54, a periphery of each solar array SA 1 and SA 2 may be discerned and extracted to define the area of each solar array SA 1 and SA 2. For instance, SA 1 may have a periphery that defines an area 56, and SA 2 may have a periphery that defines an area 58. By extracting the peripheries to define the areas 56 and 58, an approximate square footage (i.e., the area) of each solar array SA 1 and SA 2 may be calculated by the processor 24.

The area of each solar array SA 1 and SA 2 can be determined from the imaging data 54 by any suitable technique, as described above. Once the area of each solar array SA 1 and SA 2 is determined from the imaging data 54, the processor 24 can be used to automatically calculate the number of solar panels 14 for each solar array 12. For instance, in the example of FIG. 4, the area 56 of the first solar array SA 1 is determined to be 252 sq. ft., utilizing the imaging data 54. The area 58 of the second solar array SA 2 is determined to be 180 sq. ft., utilizing the imaging data 54. In one embodiment, the number of solar panels 14 in each solar array 12 can be determined by dividing the total areas 56 and 58 of each solar array SA 1 and SA 2 by a selected or pre-determined average area of a solar panel 14. For example, as noted in FIG. 2, the average size (e.g., area) of a solar panel 14 is approximately 18 sq. ft. Accordingly, to determine the number of solar panels 14 in the first solar array SA 1, the area of the first solar array SA 1 (i.e., 252 sq. ft.) is divided by the average size of a solar panel (i.e., 18 sq. ft. per SP). Thus, in the presently illustrated example, the first solar array SA 1 is calculated to include 14 SPs (i.e., 252/18=14). Similarly, to determine the number of solar panels 14 in the second solar array SA 2, the area of the second solar array SA 2 (i.e., 180 sq. ft.) is divided by the average size of a solar panel (i.e., 18 sq. ft. per SP). Thus, in the presently illustrated example, the second solar array SA 2 is calculated to include 10 SPs (i.e., 180/18=10).

Thus, in the example of FIG. 4, the total number of solar panels 14 on the house 10 in the imaging data 54 is calculated to be 24 SPs (i.e., 14+10). However, in the illustrated example which utilized the approximate average area 46 of all typical commercially available solar panels 14 (i.e., 18 sq. ft. per SP), the calculated number of solar panels 14 in SA 2, is off by one SP. That is, in the illustrated example, the second solar array SA 2 actually includes only 9 SPs, compared to the 10 SPs that were calculated from the imaging data 54, utilizing the presently described techniques. This could be because the installed solar panels 14 of the second solar array SA 2 are larger than the average area 46 of all solar panels 14 (i.e., larger than 18 sq. ft. per SP), and thus, the calculation is close, but not exactly accurate in this example. As described with regard to FIG. 3, additional information may be used by the processor 24 to more accurately calculate the total number of solar panels 14. For instance, if a part number is known, the area of each installed solar panel 14 can be more accurately determined, such that the calculation of the number of solar panels 14 is more accurate.

To provide further flexibility, a dropdown menu may be used by an insurance provider, using the computing system 20, in accordance with another embodiment. For instance, in the example of FIG. 4, where the processor 24 calculated the number of solar panels 14 to be equal to 24 SPs, a dropdown menu may be accessible by a user of the computing system 20, such that adjustments can be made. As illustrated in the instant example, the dropdown menu may allow a user to adjust the calculated number of solar panels 14 by selecting a number in the range of 21 SP-30 SP, for instance. By including dropdown menus, accessible by a user, additional information may be taken into account such that the insurance provider has more flexibility in determining the value of the property and corresponding premiums.

Still further, additional information may be automatically used (or used in conjunction with input by a user) by the computing system 20 in more accurately calculating the number of solar panels. For instance, a solar array 12 generally includes a plurality of a single type of solar panel 14. In other words, in can be assumed that a solar array 12 is composed of a number of only one type of solar panel 14. Because the length of each solar panel 14 may vary substantially by type, a length of any particular edge of the solar array 12 from the imaging data 54 may be divided by known lengths of panel types. Thus, by dividing the length of the solar array 12 as determined by the imaging data by a number of known lengths, the type of solar panel 14 can be determined by selecting the resulting quotient that is closest to a whole number. For instance, using the average length dimension 38 of each panel type 36 of FIG. 2 (i.e., SMALL—4.85 ft., MEDIUM—5.46 ft., LARGE—6.64 ft., EXTRA-LARGE—7.24 ft.), or approximations thereof (e.g., SMALL—5 ft., MEDIUM—5.5 ft., LARGE—6.5 ft., EXTRA-LARGE—7 ft.), and dividing the length of the solar array 14 from the imaging data 54 by each of the four lengths associated with the four solar panel types, four quotients will be produced. The quotient closest to a whole number may indicate with a high probability that the solar panels 14 of are a particular type (i.e., size). Once the panel type is determined, the area of the particular type of panel can be employed to more accurately calculate the number of panels using the techniques described herein.

Figure 5:
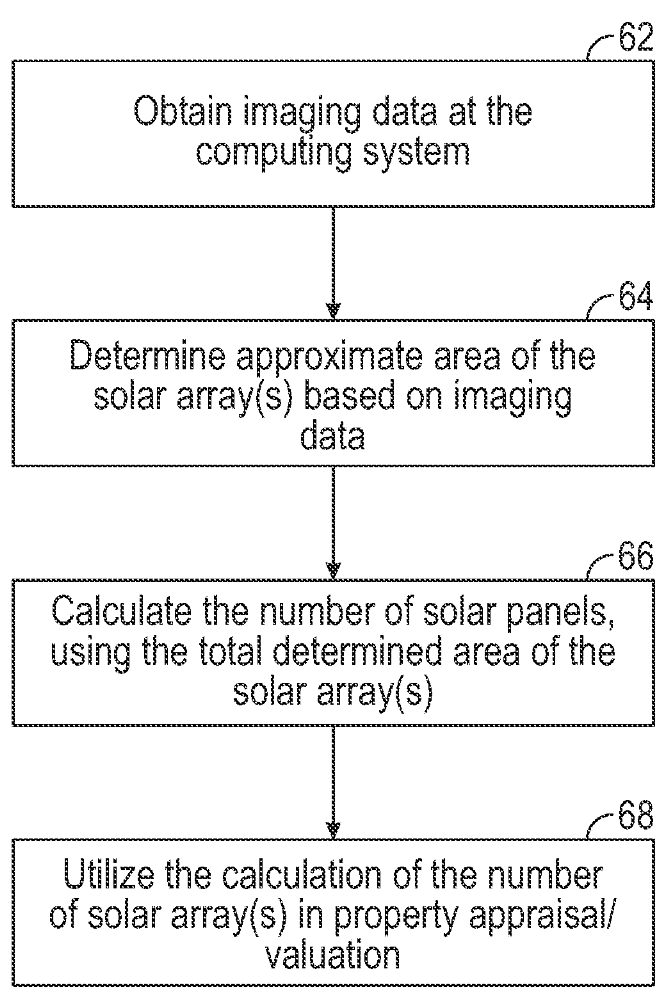
FIG. 5 is a flow chart illustrating a process for utilizing the system of FIG. 1 to calculate a number of solar panels, in accordance with embodiments described herein.

FIG. 5 is a flow chart of a process 60 for utilizing a solar panel calculation system, in accordance with embodiments described herein. At block 62, imaging data is obtained by the computing system 20. The imaging data may be captured by any suitable means and received by the computing system 20 over a network 22, for instance. The imaging data may be provided to the computing system 20 by an aerial vehicle 16 having a camera 18 thereon for capturing the imaging data. Alternatively, the imaging data may be retrieved from one or more databases in the mass storage devices 32 over a network 22. From the imaging data, the computing system 20 may identify whether one or more solar panel arrays 12 are present on the property (e.g., on the roof of a house or other structure on the property or on the ground).

Once the imaging data is obtained by the computing system 20 and one or more solar panel arrays 12 have been indentified, the processor 24 may automatically determine an approximate area (e.g., square footage) of any solar panel array 12 from the imaging data, as in block 64. For instance, the periphery of each solar array 12 may be captured and extracted from the imaging data such that the area of each solar panel array 12 can be approximated. As described, any techniques for determining an approximate area of a structure, such as a solar array 12, may be utilized. Further, because only the overall area of the structure (i.e., solar array 12) is utilized in accordance with the techniques described herein, the resolution of the imaging data need only be of the quality to discern the periphery of each solar array 12.

Once an approximate area of each solar array 12 is determined, the number of solar panels 14 in each solar array 12 may be calculated, as in block 66. The calculation may also be automatically determined by the processor 24. To calculate the number of solar panels 14 in solar array 12, the processor 24 may divide the determined area of a solar array 12, by an average area of a solar panel 14. For instance, the average area may be an average area of all commercially available types of solar panels. In other embodiments, the average area may be an average area of a particular type of solar panel 14, which may be automatically retrieved by the processor 24, or entered by a user of the computing system 20 to more accurately calculate the number of solar panels 14, based on the more specific information provided. In some embodiments, the number of calculated solar panels 14 may be adjusted by using a dropdown menu on the display 26 of the computing system 20, for instance.

Once the number of solar panels 14 is calculated, the number of solar panels 14 may be used in appraising or valuating a property, as in block 68. As appreciated, by knowing the number of solar panels 14 present on a property, insurance rates and property values can be determined to more accurately reflect the overall value of the property, as well as assessing the need for any additional insurance to independently cover assets, such as solar panels 14. Further by using aerial imaging data to approximate the number of solar panels, insurance rates can be frequently reviewed and adjusted, without the need for an in-person inspection of the insured property and without reliance on a customer to provide the information to the insurance provider.

It should be understood that while the disclosed techniques are described with regard to solar panels 14, the techniques may be useful for approximating the square footage of other structures. For instance, imaging data may be used to approximate the size of other structures that may be installed on a property, such as decks, patios or pools.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:

receiving, at a computing system, imaging data including images of one or more solar arrays, wherein each of the one or more solar arrays comprises a plurality of solar panels;

determining, by the computing system, a total area of each of the one or more solar arrays from the imaging data; and calculating, by the computing system, a number of the solar panels on each of the one or more solar arrays using the total determined area of each of the one or more solar arrays, wherein calculating comprises automatically calculating the number of solar panels on each of the one or more solar arrays.

2. The method of claim 1, wherein determining comprises automatically determining the total area of each of the one or more solar arrays.

3. The method of claim 1, further comprising generating an appraisal of a property using the calculated number of solar panels on each of the one or more solar arrays.

4. The method of claim 1, wherein receiving comprises receiving photographs of the one or more solar arrays.

5. A method, comprising:

receiving, at a computing system, imaging data including images of one or more solar arrays, wherein each of the one or more solar arrays comprises a plurality of solar panels;

determining, by the computing system, a total area of each of the one or more solar arrays from the imaging data, wherein determining comprises extracting an image of the periphery of each of the one or more solar panels to determine the total area of each of the one or more solar arrays; and calculating, by the computing system, a number of the solar panels on each of the one or more solar arrays using the total determined area of each of the one or more solar arrays.

6. The method of claim 1, wherein calculating comprises calculating the number of solar panels by dividing the total area of each of the one or more solar arrays by an average area of a solar panel.

7. A method, comprising:

receiving, at a computing system, imaging data including images of one or more solar arrays, wherein each of the one or more solar arrays comprises a plurality of solar panels;

determining, by the computing system, a total area of each of the one or more solar arrays from the imaging data; and calculating, by the computing system, a number of the solar panels on each of the one or more solar arrays using the total determined area of each of the one or more solar arrays, wherein calculating comprises calculating the number of solar panels by dividing the total area of each of the one or more solar arrays by an average area of a solar panel, wherein the average area of the solar panel is determined by calculating an approximate average area of frequently used commercially available solar panels.

8. A method, comprising:

receiving, at a computing system, imaging data including images of one or more solar arrays, wherein each of the one or more solar arrays comprises a plurality of solar panels;

determining, by the computing system, a total area of each of the one or more solar arrays from the imaging data; and calculating, by the computing system, a number of the solar panels on each of the one or more solar arrays using the total determined area of each of the one or more solar arrays, wherein calculating comprises calculating the number of solar panels by dividing the total area of each of the one or more solar arrays by an average area of a solar panel, wherein the average area of the solar panel is determined by calculating an approximate average area of solar panels of a particular type of solar panel.

9. A system, comprising:

a processor; and tangible, non-transitory, computer-readable media, comprising instructions that, when executed by the processor, cause the processor to:

determine an area of one or more solar arrays from imaging data of the one or more solar arrays; and calculate a number of solar panels in each of the one or more solar arrays based on the determined area of each of the one or more solar arrays, wherein the processor is configured to automatically calculate the number of solar panels on each of the one or more solar arrays when the instructions are executed by the processor.

10. The system of claim 9, wherein the processor is configured to receive the imaging data from an aerial vehicle.

11. The system of claim 9, wherein the processor is configured to receive the imaging data from a mass storage device.

12. The system of claim 9, wherein the processor is configured to receive the imaging data, and wherein the imaging data comprises one or more photographs.

13. The system of claim 9, wherein the tangible, non-transitory, computer-readable media, comprises instructions that, when executed by the processor, cause the processor to utilize the calculated number of solar panels in determining a value of a property comprising the solar panels.

14. The system of claim 9, comprising a display and a user interface.

15. The system of claim 14, wherein the tangible, non-transitory, computer-readable media, comprises instructions that, when executed by the processor, cause the processor to utilize information input by a user at the user interface and wherein the information is used to adjust the calculation of the number of solar panels.

16. A system, comprising:

a mass storage device; and a processor configured to:

receive imaging data including one or more solar arrays from the mass storage device;

determine an area of one or more solar arrays from the imaging data; and calculate a number of solar panels in each of the one or more solar arrays based on the determined area of each of the one or more solar arrays, wherein the processor is configured to automatically calculate the number of solar panels on each of the one or more solar arrays.

17. The system of claim 16, wherein the mass storage device is configured to receive the imaging data from one or more aerial vehicles.

18. The system of claim 16, wherein the processor is configured to generate an appraisal of a property utilizing the calculated number of solar panels.

19. The system of claim 16, wherein the processor is configured to calculate the number of solar panels by dividing the area of each of the one or more solar arrays by an average area of a solar panel.

* * * * *